(12) United States Patent
Fukuroi et al.

(10) Patent No.: US 6,398,623 B1
(45) Date of Patent: Jun. 4, 2002

(54) PROCESSING METHOD OF DEVICE AND PROCESSING METHOD OF SLIDER

(75) Inventors: Osamu Fukuroi; Ryuji Fujii, both of Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/538,298

(22) Filed: Mar. 30, 2000

(30) Foreign Application Priority Data

Apr. 12, 1999 (JP) .............................. 11-103627

(51) Int. Cl.$^7$ ................................................ B24B 1/00
(52) U.S. Cl. .............................. 451/36; 451/41; 125/12; 125/20; 83/651.1
(58) Field of Search ....................... 451/41, 36; 125/12; 125/20; 83/651.1, 875, 39, 49

(56) References Cited

U.S. PATENT DOCUMENTS 4,098,032 A * 7/1978 Olbert
5,970,603 A * 10/1999 Quintana et al.

FOREIGN PATENT DOCUMENTS

| EP | 0 818 818 A1 | 1/1998 |
|---|---|---|
| JP | A-4-195706 | 7/1992 |
| JP | A-6-282831 | 10/1994 |
| JP | A-7-296377 | 11/1995 |
| JP | 09134893 A | 5/1997 |
| JP | 10223572 A | 8/1998 |

* cited by examiner

Primary Examiner—Joseph J. Hail, III
Assistant Examiner—Willie Berry, Jr.
(74) Attorney, Agent, or Firm—Oliff & Berridge, PLC

(57) ABSTRACT

A working method capable of implementing various types of devices such as a slider available with high reliability without causing malfunction or the like due to contamination during an actual use is provided by solving a problem of deterioration in profile precision and a problem of contamination resulting from roughness of a cut surface or chipping.

A wire saw comprising a wire having a diameter greater than a width of a portion cut by a first cutting step, namely, a width of a cut groove is brought into contact with the cut groove of a bar. While the wire saw is slid in a longitudinal direction, the bar is sliced across the overall thickness of the bar along the thickness of the bar. Thus, while the bar is cut, a final cut surface formed by cutting is smoothed.

6 Claims, 5 Drawing Sheets

| | Cutting by grinding wheel | Wire saw (μm) | | | |
|---|---|---|---|---|---|
| | Diamond #800 | Diamond 1/4 | Diamond 1/2 | Diamond 1.0 | Diamond 5.0 |
| Protrusion (strain) | 5~15nm | Less than 1nm | 1~2nm | 2~3nm | 4~5nm |
| Chipping | 5~20 μm | Less than 0.3μm | 0.3~0.5 μm | 0.5~1.0 μm | 2.0~3.0 μm |
| Surface roughness (Ra) | 20~30nm | Less than 2nm | 2~3nm | 2.5~4nm | 4~6nm |

PROCESSING METHOD OF DEVICE AND PROCESSING METHOD OF SLIDER

BACKGROUND OF THE INVENTION

1. Field of the Invention

The invention relates to a method of working a device and a method of working a slider. More particularly, the invention relates to a method of working a device and a method of working a slider for cutting and individually separating devices or sliders which are formed on one substrate and require smoothness of the side and front surfaces thereof.

2. Description of the Related Art

A slider for a magnetic head for use in a magnetic recording apparatus such as a hard disc driver (hereinafter referred to as HDD) is manufactured through steps generally shown in FIGS. 8A to 8F, for example.

First, a plurality of devices 1 such as a transducer having a function of writing/reading information as the magnetic head are formed on a substrate 2 such as a ceramic substrate (see FIG. 8A).

Then, the substrate 2 is cut so as to be rectangular (see FIG. 8B). Then, the rectangular substrate 2 is further sliced into bars, each of which has a line of about ten or more devices 1 horizontally arranged, and bars 3 are separated from one another (see FIG. 8C). Heretofore, such cutting has been generally performed by using a diamond peripheral cutting edge. Then, each of the separate bars 3 is stuck on a suspension 4 with wax (not shown) or the like (see FIG. 8D). Sticking is temporary bonding such that the sliders can be separated from the suspension 4 after the sliders are completely individually separated from one another in the following step.

Then, each of the devices 1 arranged on the bar 3 is worked as the slider. That is, a head slider surface is ground, structures such as a groove for determining a width of a slider rail and a bleed slot surface are worked, and a head levitation surface, i.e., a slider rail surface is polished so as to have predetermined surface roughness of 0.05 μm or less, for example. Furthermore, an air inlet for functioning as an air bearing surface of the slider rail surface is tapered (see FIG. 8E).

After the structure of a principal part of the slider is thus formed, sliders 6, each of which comprises each of the devices 1 worked in a unit of the bar 3, are separated one by one by cutting the bar 3 at a boundary between adjacent sliders 6 (see FIG. 8F).

Then, chamfering (so-called blending) takes place (not shown). In order to prevent the slider from doing damage to the surface of a magnetic recording medium (a magnetic disk) at the time of contact start/stop when the slider mounted as a slider head is used in the HDD, chamfering is applied to more particularly an edge of the slider rail surface which is likeliest to contact the surface, additionally an edge line portion which is likely to contact the surface of the magnetic recording medium (the magnetic disk) and so on. Heretofore, the slider for the magnetic head for use in the magnetic recording apparatus such as the HDD has been manufactured through such a manufacturing process.

In the above-described step of working the slider for the magnetic head of the related art, more particularly, in the step of individually separating the sliders by cutting the bar 3, cutting is generally done by using a diamond sharp edge grinding wheel (a diamond peripheral cutting edge saw).

However, such cutting method of the related art using the diamond sharp edge grinding wheel has the following various problems. That is, the cutting method itself using the diamond sharp edge grinding wheel essentially has mechanical characteristics of cutting the bar 3 while applying a large shearing force to the bar 3, and thus a surface cut by the diamond sharp edge grinding wheel results in a crushed surface or a streaked surface. The surface roughness of the cut surface that is the crushed surface or the streaked surface can only be smoothed to about 20 nm in terms of Ra even through an approach of reducing roughness of the diamond sharp edge grinding wheel and others. So-called contamination such as external dust or particles or dust produced within the HDD itself is prone to adhere to such a rough surface.

Therefore, a problem exists. During the use of the HDD, such contamination peels off due to vibration generated during operation of the slider head, vibration created during carrying of the HDD itself or the like, and the contamination adheres to the surface of the magnetic disk that is the recording medium, or the contamination is attracted into a gap between the magnetic disk and the slider. Consequently, the contamination damages the surface of the magnetic disk.

There exists another problem. Adhesion of contamination to the surface of the magnetic disk causes a record or read malfunction such as a read/write error resulting from thermal asperity. Moreover, in the cutting method using the diamond sharp edge grinding wheel, the cut surface has the crushed surface or the streaked surface as described above. In other words, the fact that the cut surface has the crushed surface or the streaked surface means that cutting takes place while such a large shearing force is applied to the bar 3. Accordingly, high stress is applied to the bar 3 due to such a large shearing force applied during cutting. As a result, the overall shape of the cut bar 3 remains under stress strain.

Thus, the individual sliders obtained through cutting have a problem: various failures deteriorating profile precision for the slider occur. Failures include malformation, namely, convex or concave warping called a crown; poor inclination along the width of the slider rail of the air bearing surface, called a camber; poor parallelism along a length of two slider rails of the air bearing surface, called a twist (i.e., the relative positions of two slider rails are in a state in which two slider rails are not parallel to each other but twisted); and so on.

More particularly, in recent years, a further increase in an information recording density has been strongly demanded. The increase in the information recording density requires a further reduction in magnetic spacing. The reduction in the magnetic spacing is accomplished by more precisely controlling and thus further reducing a height of levitation of the slider from the recording medium. An approach of reducing a conventional height of levitation of about 40 nm to 50 nm by more than half, i.e., to about 10 nm to 20 nm and others have been also proposed. In order to realize the purpose, it is therefore strongly demanded that the air bearing surface (hereinafter referred to as ABS) is more highly precise, roughness-free, smooth and flat.

However, the cutting method of the related art using the diamond sharp edge grinding wheel has a problem of being unable to cope with a further improvement in precision of the ABS for a recent increase in the information recording density because various failures deteriorating the profile precision for the slider occur as described above.

Moreover, due to a large shearing force applied to the bar 3 during cutting as described above, protrusions of about 2 nm to 10 nm or asperities are produced at an edge at which the cut surface crosses the surface of the ABS. There is a problem that the protrusions or asperities also cause deterioration in the profile precision for the slider similarly to the above-mentioned various malformations. Although the precision of the ABS generally needs a cross crown of 10 nm or less in order to improve stability of levitation of the slider and increase the information recording density, the cutting method of the related art using the diamond sharp edge grinding wheel has a problem of being unable to cope with the need.

Moreover, the following problem exists. Chippings of about 1 nm to 20 nm are produced at the edge at which the surface of the ABS crosses the cut surface obtained by the diamond sharp edge grinding wheel and the edge at which a rear surface opposite to the ABS crosses the cut surface obtained by the diamond sharp edge grinding wheel. Similarly to the above-mentioned contamination such as dust, the chippings peel off the slider due to vibration, shock or the like during the use of the HDD, and thus the chippings damage the surface of the magnetic disk as the contamination or cause the malfunction such as the read/write error resulting from the thermal asperity.

The HDD of the related art is manufactured in a clean room whose cleanness is comparable to that of class 100 or more for a process of manufacturing LSI in order to prevent contamination from entering the HDD at the time of manufacturing. Moreover, an air filter is included in the HDD so as to cope with mainly external contamination. Such an approach allows coping with an entry of contamination during manufacturing and an entry of external contamination.

However, during manufacturing, the contamination produced by peeling of chippings as described above adheres to the cut surface still in the form of chipping. The chippings are not recognized as a cause of failures. Thus, the chippings are likely to cause malfunction at the time of an actual use of the HDD, but the chippings are not checked and are overlooked. At the time of the actual use of the HDD, the slider having the adhering chippings makes a relative movement over the nearly overall surface of the magnetic disk. Thus, the slider is always located on or near the magnetic disk whenever the chippings peel off. Thus, almost all the particles of the peeling chippings always drop onto and adhere to the magnetic disk. Consequently, there is a problem that the particles produced by the peeling of the chippings are extremely likely to damage the surface of the magnetic disk or cause the read/write error as the contamination.

In any of the above-mentioned cases, the slider including a magnetic head function portion such as the transducer has been described as the device 1 to be separated of the typical related art. However, it is needless to say that the type of device is not limited to only this type. An example of the type of devices to be individually separated after being formed is a contact-type image sensor comprising, for instance, a staggered arrangement of a plurality of optical sensor devices. Nearly the same problems of the cut surface as the above-mentioned problems arise in a step of separating a plurality of optical sensor devices, or the like. Moreover, nearly the same problems of the cut surface as the above-mentioned problems arise in a step of separating levitation-type heads of a structure in which an optical module for magneto-optical recording, instead of the magnetic head, is mounted on a tip of a suspension arm, or the like. Furthermore, nearly the same problems of the cut surface as the above-mentioned problems arise in a step of separating levitation-type heads of a structure having both of a magnetic head and an optical head for magneto-optical recording, or the like. Furthermore, nearly the same problems of the cut surface as the above-mentioned problems arise in a step of separating contact-type magnetic heads or optical heads including a contact pad for contacting the surface of the magnetic disk without damaging the surface of the magnetic disk, or the like.

In order to eliminate the roughness of the cut surface and the chippings described above, the final cut surfaces of each of the individual devices or sliders must be polished or subjected to other processes after the devices or sliders are completely cut and individually separated. A technique of individually polishing the sliders through such a step is proposed in Japanese Patent Laid-open No. Hei 6-282831, for example. However, a step of lapping each of the cut surfaces of each slider after individually separating the devices or sliders is extremely complicated, and thus the time required for the step is long. That is, in a conventional method in which polishing such as lapping is applied to the sliders individually separated, a step of attaching each of the individually-separated sliders to a lapping apparatus and lapping four side surfaces of each slider, i.e., the cut surfaces of each slider is an extremely complicated step. Thus, the conventional method has a problem that a throughput of the step is inefficient and thus the step requires a long time.

The invention is designed to overcome the foregoing problems. It is an object of the invention to provide a method of working a device and a method of working a slider, which solve the problem of the deterioration in the profile precision and the problem of the contamination resulting from the roughness of the cut surface or the chippings in a cutting step of individually separating a plurality of devices formed on one substrate, thereby being capable of manufacturing the slider for implementing the magnetic head that is available for the HDD with high reliability without causing the damage to the magnetic disk and the read/write error when the magnetic head, for example, is incorporated and used in the HDD.

SUMMARY OF THE INVENTION

A method of working a device of the invention for individually separating a plurality of devices formed on one substrate comprises: a supporting step for allowing a suspension to support the devices on a rear surface opposite to a front surface of the substrate on which the devices are formed; a notching step for cutting a notch at a boundary set between the devices on the substrate to some midpoint of a thickness of the substrate along the thickness of the substrate from the front surface of the substrate; and a substrate cutting step for bringing a wire saw of a diameter greater than a width of the notch into contact with the notch, and slicing the substrate across the overall thickness of the substrate along the thickness of the substrate while sliding the wire saw in a longitudinal direction, thereby smoothing a cut surface formed by cutting while cutting the substrate.

Another method of working a device of the invention for individually separating a plurality of devices formed on one substrate comprises: a supporting step for allowing a suspension to support the devices on a rear surface opposite to a front surface of the substrate on which the devices are formed; a first cutting step for cutting a boundary set between the devices on the substrate across the overall thickness of the substrate along the thickness of the substrate from the front surface of the substrate; and a second cutting step for bringing a wire saw of a diameter greater than a width of a portion cut by the first cutting step into contact with the portion, and slicing the substrate across the overall thickness of the substrate along the thickness of the substrate while sliding the wire saw in a longitudinal direction, thereby smoothing a cut surface formed by cutting while cutting the substrate.

A method of working a slider of the invention for individually separating a plurality of sliders formed on one substrate comprises: a supporting step for allowing a suspension to support the sliders on a rear surface opposite to a front surface of the substrate on which the sliders are formed; a notching step for cutting a notch at a boundary set between the sliders on the substrate to some midpoint of a thickness of the substrate along the thickness of the substrate from the front surface of the substrate; and a substrate cutting step for bringing a wire saw of a diameter greater than a width of the notch into contact with the notch, and slicing the substrate across the overall thickness of the substrate along the thickness of the substrate while sliding the wire saw in a longitudinal direction, thereby smoothing a cut surface formed by cutting while cutting the substrate.

Another method of working a slider of the invention for individually separating a plurality of sliders formed on one substrate comprises: a supporting step for allowing a suspension to support the sliders on a rear surface opposite to a front surface of the substrate on which the sliders are formed; a first cutting step for cutting a boundary set between the sliders on the substrate across the overall thickness of the substrate along the thickness of the substrate from the front surface of the substrate; and a second cutting step for bringing a wire saw of a diameter greater than a width of a portion cut by the first cutting step into contact with the portion, and slicing the substrate across the overall thickness of the substrate along the thickness of the substrate while sliding the wire saw in a longitudinal direction, thereby smoothing a cut surface formed by cutting while cutting the substrate.

In the method of working a device or the method of working a slider of the invention, the notch is previously cut to some midpoint of the thickness of the substrate, or the wire saw is brought into contact with the notch previously cut by the first cutting step. In this case, the notch previously formed serves as a guideline and guides the wire saw to an appropriate boundary, i.e., a cutting position by self alignment, whereby cutting takes place at a precise position. Moreover, the wire saw passes through a portion which is already cut with a small width or is cut to at least some midpoint of the thickness. Thus, only a very small shearing force is applied to the substrate from the viewpoint of the strength of materials, compared to the shearing force for a method of the related art in which one cutting takes place using a diamond grinding wheel. Only a small shearing force such as is substantially close to the shearing force for polishing rather than the shearing force for general cutting is applied to the substrate.

Therefore, the substrate can be cut with high precision while the cut surface is smoothed at the time of cutting using the wire saw, without causing deterioration in profile precision, roughness of the cut surface, chipping or the like as in the related art. Moreover, the method of the invention can cut the substrate with high precision for a short time and can also make smoothness of the cut surface excellent, compared to a technique proposed in, for example, Japanese Patent Laid-open No. Hei 4-195706, No. Hei 7-296377 or the like in which the substrate is cut by only one cutting step using the wire saw so as to individually separate magnetic heads.

One reason is as follows. In the case of a cutting method according to the invention, the notch is previously provided as described above and thus the notch allows the wire saw to be guided to the precise position by self alignment. Another reason is that the wire saw can always do cutting with the precise diameter portion thereof by appropriately shifting the worn portion thereof and thus an error of a cutting allowance can be reduced. Moreover, the wire saw cuts a portion which is previously cut although a width of cut is small as described above, and thus final cutting can be done by a small shearing force alone. Accordingly, a speed at which the wire saw slices the substrate along the thickness of the substrate at the time of cutting can be made faster than a cutting speed of the wire saw of the related art (e.g., Japanese Patent Laid-open No. Hei 4-195706). In other words, the slicing time can be made shorter than the cutting time of the related art. Moreover, the cut surface obtained through cutting can have excellent smoothness.

In the method of working a device or the method of working a slider of the invention, the notching step for cutting the notch or the first cutting step for performing first cutting may be performed by the use of the diamond grinding wheel. Alternatively, these steps may be also performed by the use of the wire saw whose diameter is smaller than that of the wire saw for the second cutting step.

The suspension for supporting the devices or the sliders on the rear surface thereof may be joined to the rear surface of the substrate in such a manner that the overall surface of the suspension is in contact with the rear surface of the substrate. Alternatively, the suspension may be joined to only the devices or the sliders so as not to be joined to the cutting allowance between the devices or the sliders, thereby supporting the devices or the sliders by only the joint portions.

Moreover, in the method of working a slider of the invention, it is desirable that the substrate cutting step uses both of slurry containing abrasive grains having a particle diameter of 5 $\mu$m or less and the wire saw.

That is, an empirical rule that a damaged layer and a chipping produced at the time of cutting are both 5 $\mu$m at the maximum has been heretofore obtained from previous practical manufacturing experience. It is therefore desirable that the substrate is cut by the wire saw by using the slurry containing abrasive grains having a particle diameter of 5 $\mu$m or less in order to control a stock allowance equal to or less than 5 $\mu$m, i.e., a size of the damaged layer and the chipping. More preferably, the particle diameter of the abrasive grain for use in the slurry is equal to about 1 $\mu$m. If the size is less than 1 $\mu$m, cutting efficiency, in fact, tends to decrease. If the abrasive grain has a particle diameter exceeding 5 $\mu$m, the abrasive grain does not differ much from a conventional diamond grinding wheel and thus there is a tendency to be incapable of obtaining smoothness and precision required for the slider. Accordingly, in consideration of such a qualitative tendency, the particle diameter of the abrasive grain for use in the slurry can be appropriately determined within a range of a particle diameter of 5 $\mu$m or less so that the particle diameter can be adapted to the required smoothness and precision in dimension of cut.

If an amount of removal by the wire saw is too large, cutting does not differ much from cutting using the conventional diamond grinding wheel and thus a problem arises: the shearing force increases and the cutting time also increases. It is therefore desirable that a difference in dimension between the width of cut (gap) by the first cutting step and the diameter of the wire saw is equal to 5 $\mu$m to 15 $\mu$m per cut surface. However, the difference in dimension is not limited to these values. For example, when the width of the damaged layer produced by the first cutting step or the size of the chipping is larger than 5 μm, it is, of course, desirable that the wire saw having such a diameter as can ensure the removal of the damaged layer or the chipping is used.

Powders of diamond, sapphire or the like for a general abrasive grain can be used as a material of the above-mentioned abrasive grain. When the slurry is not used, the wire saw having abrasive grains deposited to a wire itself, such as a diamond-electrodeposited wire saw, can be used.

Moreover, the devices or the sliders may be removed from the suspension after the cutting step according to the invention. Alternatively, for example, the suspension is made of an insulating material and the substrate is cut together with the suspension into the individual devices or sliders, whereby the insulating suspension can be used as an insulating layer in each device or slider finally obtained. In short, the suspension may be also used as a part of a structure of each of the devices or sliders such as the insulating layer, without being removed from the individual devices or sliders.

Other and further objects, features and advantages of the invention will appear more fully from the following description.

DETAILED DESCRIPTION OF THE PREFERRED EMBODIMENTS

Embodiments of the invention will be described in detail below with reference to the accompanying drawings.
[First embodiment]

Figure 1:
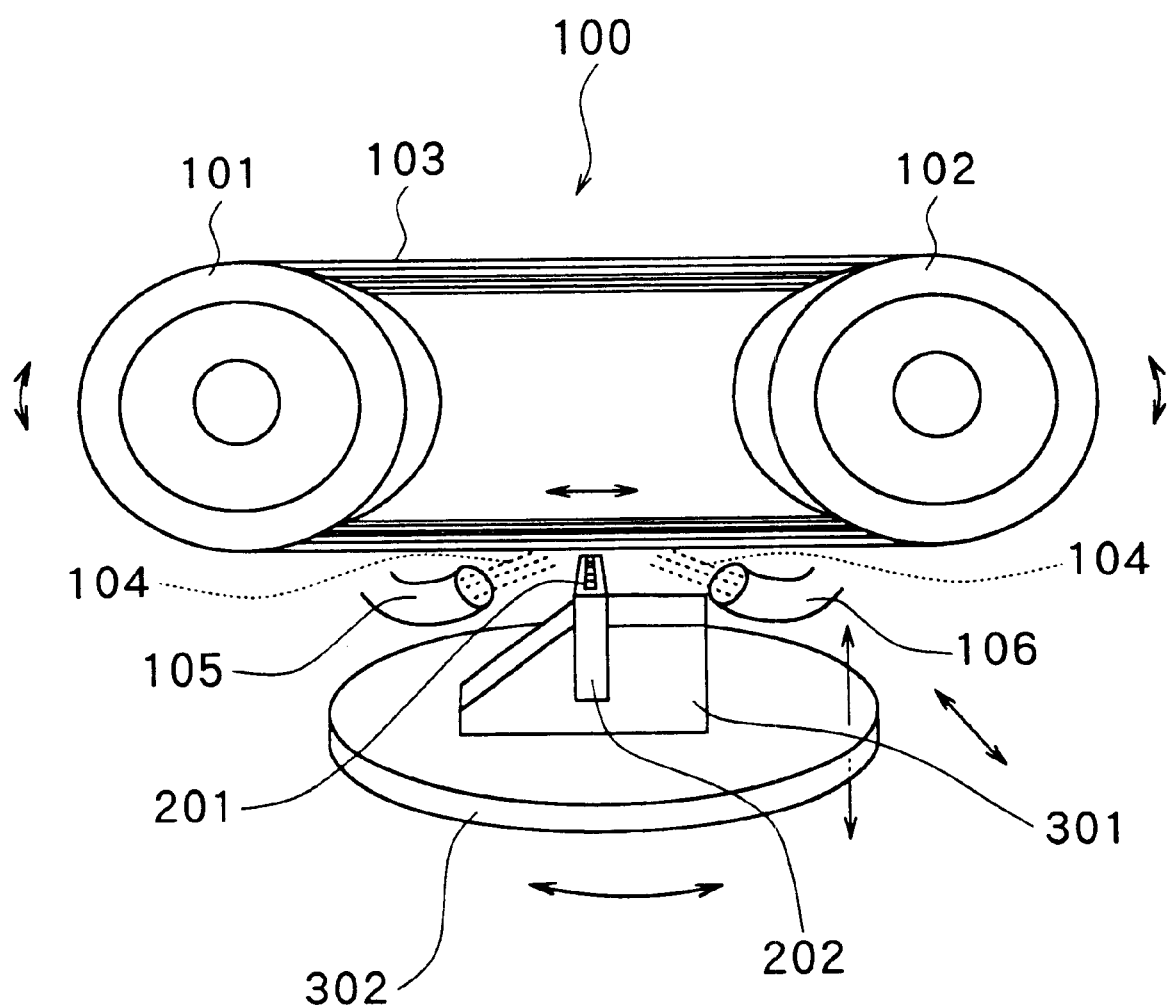
FIG. 1 is a schematic illustration of a principal part of a constitution of a wire saw apparatus for use in a working method according to a first embodiment of the invention and a bar on which a plurality of sliders to be worked (to be cut and separated) by the wire saw apparatus are arranged.

FIG. 1 is a schematic illustration of a principal part of a constitution of a wire saw apparatus 100 for use in a method of working a slider and a method of working a device according to a first embodiment of the invention and a bar 201 on which a plurality of sliders 200 to be worked (to be cut and separated) by the wire saw apparatus 100 are arranged.

The wire saw apparatus 100 has the principal part comprising two work rollers 101 and 102 facing each other substantially parallel to each other; a wire saw 103 wound around the two work rollers 101 and 102; nozzles 105 and 106 for feeding slurry (grinding solution) 104 to a portion of the wire saw 103 to be brought into contact with the bar 201 to be worked; a collet pedestal 301 for mechanically supporting the bar 201 to be worked; and a work table 302 on which the bar 201 and the collet pedestal 301 are placed and which changes its position relative to the wire saw 103 by making a vertical movement and a horizontal rotation.

The wire saw apparatus 100 is used in a second cutting step to be described later. It is needless to say that before the second cutting step a substrate is already worked into the form of the bar 201 having an arrangement of the sliders 200 and a suspension 202 is stuck on a rear surface of the bar 201.

Next, main steps of the method of working the slider according to the first embodiment will be described with reference to FIGS. 2A to 2D.

Figure 2:
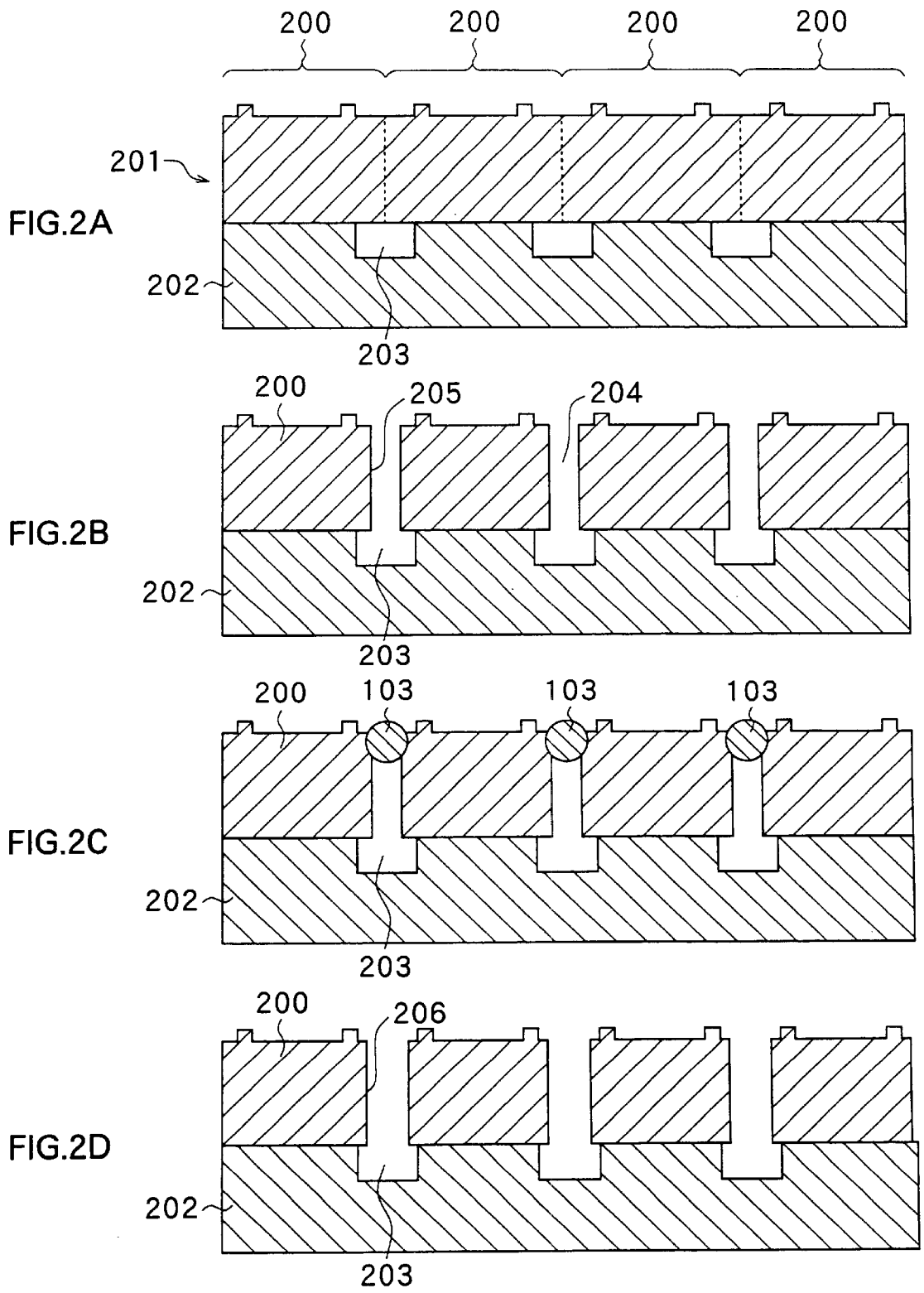
FIGS. 2A to 2D are cross sectional views of a sequence of main steps of a method of working a slider according to the first embodiment of the invention.

First, as shown in FIG. 2A, in a supporting step, the suspension 202 for supporting the sliders 200 is stuck on the rear surface of the substrate, i.e., the bar 201, opposite to the front surface thereof on which the sliders 200 are formed. Wax or the like, which has been heretofore generally used, can be preferably used as an adhesive for use in the step. Instead of the adhesive, the suspension 202 may adhere to the bar 201 ("supporting step").

Moreover, in the suspension 202, a clearance 203 is previously provided in a portion corresponding to a boundary between adjacent sliders 200, i.e., a width of cut. In first and second cutting steps to be described later, the clearance 203 is taken as a condition for approximately uniform cutting between the front surface of the bar 201 and the clearance 203. Although the provision of the clearance 203 is more desirable, the clearance 203 is not indispensable. It therefore goes without saying that the clearance 203 can be eliminated.

Then, as shown in FIG. 2B, many sliders 200 included in one bar 201 are cut at the boundaries across the overall thickness along the thickness from the front surface of the bar 201, whereby the sliders 200 are individually separated from one another. At this time, in the embodiment, the suspension 202 is not cut. Even if an upper portion of the suspension 202 is slightly deeply cut or damaged as shown in FIG. 2B, there is no problem as long as the suspension 202 is not completely cut at this time. In short, it is essential only that the individual sliders 200 of the cut bar 201 can be joined to the suspension 202 ("first cutting step").

In the first cutting step, a cutting method of the related art using a general diamond grinding wheel, for example, is adopted. Cutting using the diamond grinding wheel has many problems: a cut surface or an edge has a great degree of surface roughness as mentioned above; poor profile or chipping often occurs; and a cutting allowance varies considerably due to wear in the grinding wheel and thus the cutting allowance has low accuracy of dimension. However, because the diamond grinding wheel may be considered as a rigid body, a very high degree of alignment precision of a cutting position, i.e., pitch precision of a cutting line can be obtained through the use of a slicer having submicron feed precision or other means.

Once the first cutting step is performed with high pitch precision and then a cut gap, i.e., a cut groove 204 formed through the first cutting step is provided at the high-precision position obtained through the step, the wire saw is self-aligned along the cut groove 204 formed at the high-precision position because a wire saw for use in the second cutting step to be described later is flexible. Thus, the wire saw can be accurately positioned.

Even through the use of the wire saw having good surface smoothness of the cut surface but intrinsically having difficulty in obtaining high pitch precision, the wire saw 103 is guided to the cut groove 204 formed through the first cutting step and therefore high pitch precision can be obtained at the cutting position. In this sense, the cutting method using a general diamond grinding wheel can be preferably adopted in the first cutting step.

An example of the diamond grinding wheel and the detailed using method thereof in the first cutting step is as follows:

- the number of revolutions of the grinding wheel: about 12,000;
- a feed speed: about 90 mm per minute;
- a yarn count of the grinding wheel: No. 800 to No. 1500;
- a diameter of the grinding wheel: about 90 mm;
- a material of the grinding wheel: a metal bond grinding wheel; and
- a cutting allowance: about 160 $\mu$m.

In this case, the pitch precision is set so that a cumulative pitch error of the cut groove 204 in one bar 201 may be equal to or less than 2 $\mu$m.

Figures 3, 4:
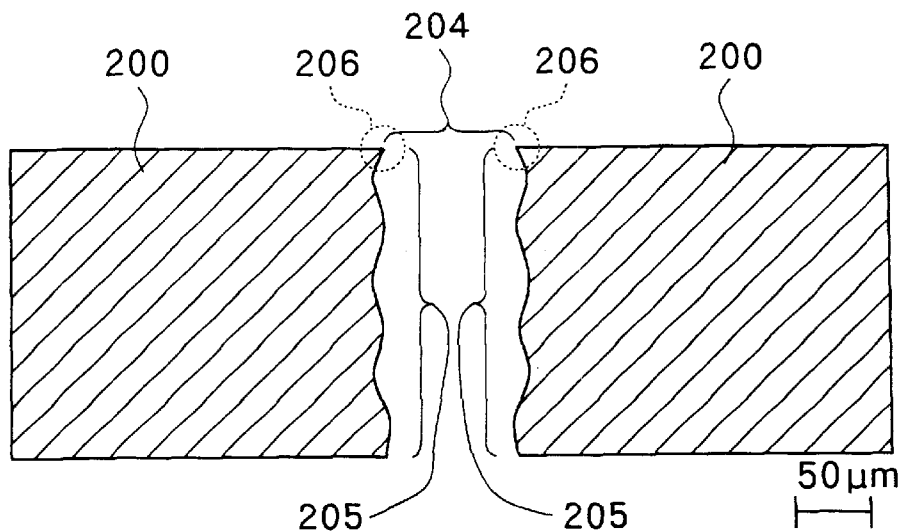
FIG. 3 is a cross sectional view for illustrating a state of a cut surface and an edge of a part of a front surface after a first cutting step.
FIG. 4 is a table for quantitatively showing a state of the cut surface formed by the first cutting step.

FIG. 3 shows a state of the cut surface and the edge of more particularly a part of the front surface obtained through the first cutting step under the above-mentioned condition, wherein the state observed by a microscope is copied based on the photomicrograph. It can be seen from the drawing that cut surface 205 is clearly rough and chipping 207 is produced on the edge. As shown in Table of FIG. 4, in this state, the surface roughness (Ra) of the cut surface 205 was equal to 20 nm to 30 nm, a size of the chipping was equal to 5 $\mu$m to 20 $\mu$m and a size of a protrusion (strain) was equal to 5 $\mu$m to 15 $\mu$m. On the other hand, although not shown in FIGS. 3 and 4, position precision of the cut groove 204, i.e., the pitch precision is extremely high.

Figure 7:
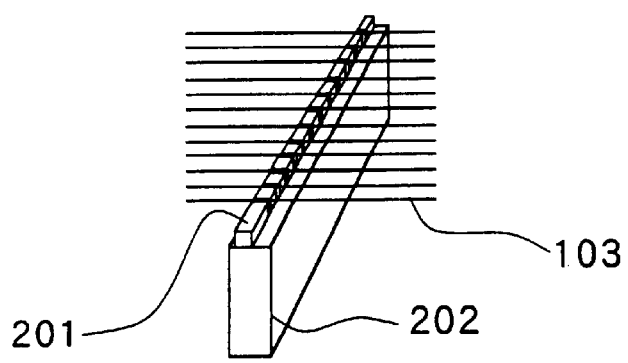
FIG. 7 is an illustration of a state in which a wire saw is brought into contact with a cut groove portion of the bar.
Figure 8A:
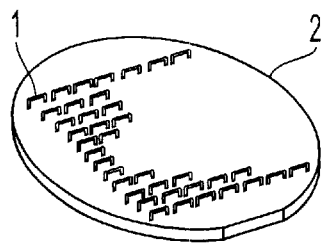
FIGS. 8A to 8F illustrate an example of a general slider working step of the related art.
Figure 8B:
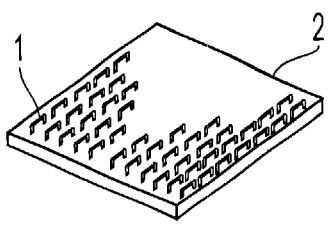
Figure 8C:
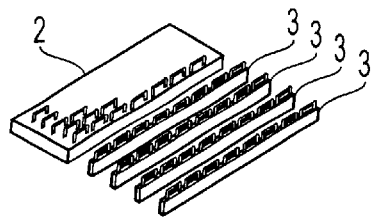
Figure 8D:
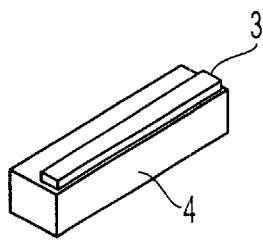
Figure 8E:
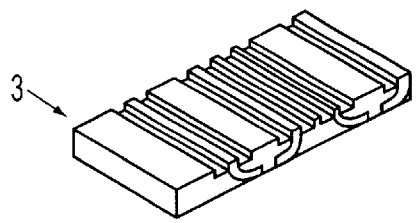
Figure 8F:
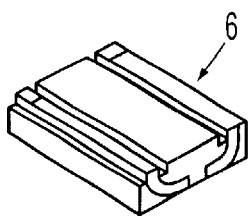

After the first cutting step, as shown in FIGS. 2C and 7, the wire saw whose diameter is greater than the width of a portion cut by the first cutting step, i.e., the width of the cut groove 204 is brought into contact with a portion of the cut groove 204 of the bar 201. While the wire saw is slid in a longitudinal direction, the bar 201 is sliced across the overall thickness of the bar 201 along the thickness of the bar 201. Thus, while the bar 201 is cut, a final cut surface 206 formed by cutting is smoothed ("second cutting step").

The second cutting step permits cutting the bar 201 into the completely individual sliders 200 while forming the extremely smooth cut surface 206, as shown in FIG. 2D and Table of FIG. 4.

Figure 5:
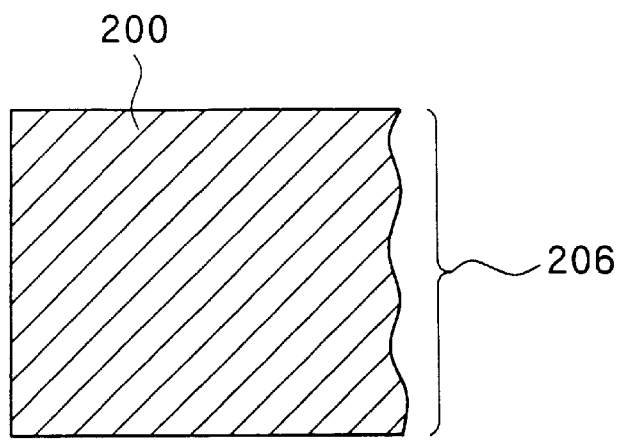
FIG. 5 is a cross sectional view of the cut surface formed through a second cutting step and the edge thereof, more particularly showing a state of a part of the front surface.

FIG. 5 shows a state of the cut surface 206 thus formed and the edge thereof, showing more particularly a state of a part of the front surface observed by a microscope, wherein an outer shape of the state is copied based on the photomicrograph. It can be seen that the cut surface 206 has few asperities and chippings and is extremely smooth, compared to the cut surface obtained through the above-mentioned first cutting step shown in FIG. 3.

An example of a method of using the wire saw in the second cutting step is as follows:

- a wire speed: 600 m/min;
- a wire dispensing speed: 3 m/min;
- a wire tension: 6 kg;
- a width of the cut groove 204 at the time of the above-mentioned first cutting step: about 160 $\mu$m;
- a wire diameter (after cutting by the wire saw): 200 $\mu$m (i.e., an amount of removal of 20 $\mu$m per cut surface);
- a work feed speed: 0.5 mm/min;
- lapping slurry: oil to which 1-2 wt% of diamond abrasive grains of 0.25 $\mu$m diameter is added;
- a slurry feed rate: 1-2 l/min; and
- a working time: 5 minutes to 10 minutes per bar.

Moreover, set surface roughness is set to 2 nm or less, and an acceptable set protrusion (asperity) is set to 2 nm or less.

The second cutting step is performed by using the wire saw under the above-mentioned condition. As a result, as shown in Table (a "diamond ¼" column) of FIG. 4, the protrusion (strain) is less than 1 $\mu$m, the size of chipping is less than 0.3 $\mu$m, and the surface roughness (Ra) is less than 2 nm. It has been shown that the cut surface and the edge, which are extremely smooth and excellent for side surfaces of the sliders 200, are formed.

After the second cutting step is thus performed so that the bar 201 is cut into the individual sliders 200, the individual sliders 200 are separated from the suspension 202, whereby the sliders 200 completely separated can be obtained.

In the embodiment, it has been described that the sliders 200 are finally separated from the suspension 202. However, the invention is not limited to this embodiment. Alternatively, for example, the suspension 202 is made of an insulating material and the bar 201 is cut together with the suspension 202 into the individual sliders 200, whereby the insulating suspension 202 can be used as an insulating layer in each slider 200 finally obtained. Thus, the suspension 202 can be also used as the insulating layer constituting a part of a structure of each of the sliders 200, without being removed from the individual sliders 200. In this case, the suspension 202 may be completely cut in the second cutting step, or the suspension 202 may be completely cut in another step after the sliders 200 are cut in the second cutting step.

[Second embodiment]

Next, a second embodiment of the invention will be described.

Figure 6:
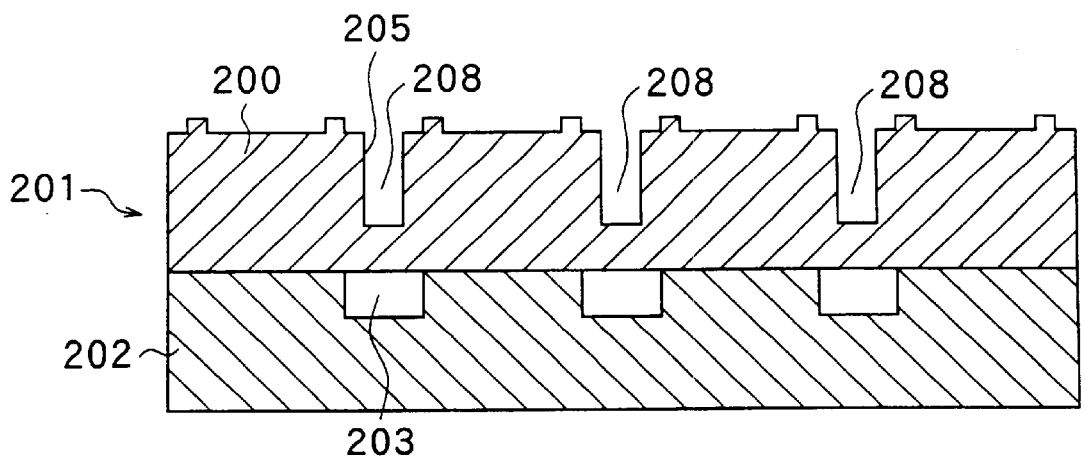
FIG. 6 is a cross sectional view for illustrating a notching step of a second embodiment of the invention.

In the first embodiment, in the first cutting step, the bar 201 is completely cut across the overall thickness thereof from the front surface thereof to the rear surface thereof. On the other hand, the second embodiment comprises a notching step for cutting notches 208 to some midpoint of the thickness of the bar 201 as shown in FIG. 6, as a step corresponding to the first cutting step (see FIG. 2B) of the first embodiment. The other steps and methods of the second embodiment are the same as those of the first embodiment, and thus the description thereof is omitted. A working method of the second embodiment can obtain an extremely smooth and excellent cut surface, nearly similarly to the first embodiment.

In the second embodiment, the notch 208 is first cut to some midpoint of the thickness of the bar 201. Thus, the wire saw 103 is guided to the notch 208 and brought into contact with the precise position by self alignment. Additionally, the notch 208 is always present in the bar 201, i.e., at least the front surface thereof which most requires smoothness and no chipping. The precise contact of the wire saw 103 and the presence of the notch 208 ensure that the wire saw 103 comes into contact with the front surface of the bar 201 by a small shearing force similarly to the first embodiment, thereby enabling the cut surface of the contact portion to be extremely smoothed. Moreover, the notch 208 is previously cut to some depth, whereby a shearing force and a residual stress resulting from the shearing force decrease also at a portion not having a notch deeper than the notch 208. Accordingly, the surface of the portion having no deeper notch can be also smoothed without being roughed. Moreover, the occurrence of malformation such as a cross crown can be avoided.

A preferable quantitative range of a depth of cut of the notch 208 is not determined. That is because a state of the cut surface varies in accordance with a combination of hardness of the bar 201 in terms of the strength of materials and hardness of abrasive grains or a balance between the hardness and the cutting allowance.

However, qualitatively speaking, the notch 208 must be cut to such a depth that the set surface roughness can be equal to or less than 2 nm and the acceptable set protrusion (asperity) can be equal to or less than 2 nm as mentioned above. Therefore, the depth of the notch 208 can be determined in the following manner. Prior to an actual application of the working method according to the invention, a cutting test is carried out as a trial according to specifications of the bar 201 and the wire saw 103 for cutting the bar 201. Such a preferable depth as can realize the above-mentioned set surface roughness and acceptable set protrusion (asperity) is determined in accordance with the result of the test.

In any of the above-mentioned embodiments, the description has been given with regard to an example of application of the invention to a step of working the slider. It is, however, needless to say that the application of the invention is not limited to only this example. Besides, the invention is generally applicable to a device which requires some mechanical smoothness in shape. An example of this type of device is a contact-type image sensor comprising, for instance, a staggered arrangement of a plurality of optical sensor devices. Mechanical smoothness is also required for a step of separating a plurality of optical sensor devices constituting the contact-type image sensor, or the like. If the separated optical sensor devices have chippings or the like, damage to the surface of an optical sensor or the like occurs when the chippings or the like peel off. Consequently, a problem arises. That is, the optical sensor device also requires the prevention of the chippings and the roughness of the cut surface. The invention can be suitably used also in this case.

Alternatively, similarly to the above-described embodiments, the invention can be suitably used in a step of separating levitation-type heads of a structure in which an optical module for magneto-optical recording, instead of a magnetic head, is mounted on a tip of a suspension arm, or the like. Moreover, similarly to the above-described embodiments, the invention can be suitably used in a step of separating levitation-type heads of a structure having both of a magnetic head and an optical head for magneto-optical recording, or the like.

Furthermore, similarly to the above-described embodiments, the invention can be suitably used in a step of separating contact-type magnetic heads or optical heads including a contact pad for contacting the surface of the magnetic disk without damaging the surface of the magnetic disk, or the like.

As described above, according to the method of working a device or the method of working a slider of the invention, the notch is previously cut to some midpoint of the thickness of the substrate, or the wire saw is brought into contact with the notch previously cut by the first cutting step. In this state, the substrate is cut, whereby the devices or the sliders are individually separated from one another. Thus, the notch previously formed serves as a guideline and guides the wire saw to an appropriate boundary, i.e., the cutting position by self alignment, whereby cutting can take place at the precise position.

More particularly, in cutting and individually separating the devices or sliders which are formed on one substrate and require the smoothness of the side and front surfaces thereof, the problem of the deterioration in the profile precision and the problem of the contamination resulting from the roughness of the cut surface or the chippings are solved, whereby it is therefore possible to provide the slider for implementing the magnetic head that is available for the HDD with high reliability without causing the damage to the magnetic disk and the read/write error when the magnetic head, for example, is incorporated and used in the HDD.

By solving the problem of the deterioration in the profile precision and the problem of the contamination resulting from the roughness of the cut surface or the chippings, it is also possible to provide various types of devices such as an optical sensor device available with high reliability without causing malfunction or the like due to the contamination at the time of an actual use.

Obviously many modifications and variations of the present invention are possible in the light of the above teachings. It is therefore to be understood that within the scope of the appended claims the invention may be practiced otherwise than as specifically described.

What is claimed is:

1. A method of working a device for individually separating a plurality of devices formed on one substrate, comprising:

a supporting step for allowing a suspension to support the devices on a rear surface opposite to a front surface of the substrate on which the devices are formed;

a notching step for cutting a notch in a first direction at a boundary set between the devices on the substrate to some midpoint of a thickness of the substrate along the thickness of the substrate from the front surface of the substrate; and a substrate cutting step for bringing a wire saw of a diameter greater than a width of the notch into contact with the notch, and slicing the substrate in the first direction across the overall thickness of the substrate along the thickness of the substrate while sliding the wire saw in a longitudinal direction, thereby smoothing a cut surface formed by cutting while cutting the substrate.

2. A method of working a device for individually separating a plurality of devices formed on one substrate, comprising:

a supporting step for allowing a suspension to support the devices on a rear surface opposite to a front surface of the substrate on which the devices are formed;

a first cutting step for cutting a boundary in a first direction set between the devices on the substrate across the overall thickness of the substrate along the thickness of the substrate from the front surface of the substrate; and a second cutting step for bringing a wire saw of a diameter greater than a width of a portion cut by the first cutting step into contact with the portion, and slicing the substrate in the first direction across the overall thickness of the substrate along the thickness of the substrate while sliding the wire saw in a longitudinal direction, thereby smoothing a cut surface formed by cutting while cutting the substrate.

3. A method of working a slider for individually separating a plurality of sliders formed on one substrate, comprising:

a supporting step for allowing a suspension to support the sliders on a rear surface opposite to a front surface of the substrate on which the sliders are formed;

a notching step for cutting a notch at a boundary in a first direction set between the sliders on the substrate to some midpoint of a thickness of the substrate along the thickness of the substrate form the front surface of the substrate; and a substrate cutting step for bringing a wire saw of a diameter greater than a width of the notch into contact with the notch, and slicing the substrate in the first direction across the overall thickness of the substrate along the thickness of the substrate while sliding the wire saw in a longitudinal direction, thereby smoothing a cut surface formed by cutting while cutting the substrate.

4. A method of working a slider according to claim 3, wherein the substrate cutting step is performed through the use of slurry, containing abrasive grains having a particle diameter of 5 $\mu$m or less and the wire saw.

5. A method of working a slider for individually separating a plurality of sliders formed on one substrate, comprising:

supporting step for allowing a suspension to support the sliders on a rear surface opposite to a front surface of the substrate on which the sliders are formed;

a first cutting step for cutting a boundary set between the sliders on the substrate across the overall thickness of the substrate along the thickness of the substrate from the front surface of the substrate; and a second cutting step for bringing a wire saw of a diameter greater than a width of a portion cut by the first cutting step into contact with the portion, and slicing the substrate in a first direction across the overall thickness of the substrate along the thickness of the substrate while sliding the wire saw in a longitudinal direction, thereby smoothing a cut surface formed by cutting while cutting the substrate.

6. A method of working a slider according to claim 5, wherein the substrate cutting step is performed through the use of slurry containing abrasive grains having a particle diameter of 5 $\mu$m or less and the wire saw.

* * * * *